United States Patent [19]

Yamashita et al.

[11] Patent Number: 5,399,278
[45] Date of Patent: Mar. 21, 1995

[54] PROCESS FOR PRODUCING ACICULAR GOETHITE PARTICLES AND ACICULAR MAGNETIC IRON OXIDE PARTICLES

[75] Inventors: Katsumi Yamashita; Tosiharu Harada; Haruki Kurokawa; Kazuhisa Inaba; Hideaki Sadamura; Tomohisa Moriya; Junichi Kawano, all of Hiroshima, Japan

[73] Assignee: Toda Kogyo Corp., Hiroshima, Japan

[21] Appl. No.: 22,844

[22] Filed: Feb. 25, 1993

Related U.S. Application Data

[62] Division of Ser. No. 733,724, Jul. 22, 1991, abandoned.

[30] Foreign Application Priority Data

May 31, 1991 [JP] Japan .................................. 3-157831

[51] Int. Cl.⁶ ........................ C01G 49/06; C01G 49/08
[52] U.S. Cl. ................................. 252/62.56; 423/632; 423/633; 423/634; 427/127; 427/128
[58] Field of Search ....................... 423/632, 633, 634; 252/62.56; 427/127, 128

[56] References Cited

U.S. PATENT DOCUMENTS

| | | | |
|---|---|---|---|
| 4,033,891 | 7/1977 | Matsui et al. | 252/62.56 |
| 4,108,787 | 8/1978 | Masaki et al. | 423/634 |
| 4,136,049 | 1/1979 | Horiishi et al. | 252/62.56 |
| 4,136,158 | 1/1979 | Okuda et al. | 423/632 |
| 4,188,302 | 2/1980 | Becker et al. | 252/62.56 |
| 4,495,164 | 1/1985 | Okuda et al. | 423/634 |
| 4,873,010 | 10/1989 | Takedoi | 252/62.59 |

FOREIGN PATENT DOCUMENTS

| | | | |
|---|---|---|---|
| 2380225 | 9/1978 | France . | |
| 3026686 | 2/1982 | Germany | 423/633 |
| 3631193 | 3/1988 | Germany | 423/632 |
| 3732526 | 4/1989 | Germany . | |
| 55-167135 | 12/1980 | Japan | 423/632 |
| 58-25202 | 2/1983 | Japan | 423/632 |
| 60-195023 | 10/1985 | Japan | 423/632 |
| 61-168536 | 7/1986 | Japan | 423/633 |
| 61-186225 | 8/1986 | Japan | 423/632 |
| 62-223022 | 10/1987 | Japan | 423/633 |
| 2-59431 | 2/1990 | Japan | 423/632 |
| 2059410 | 4/1981 | United Kingdom . | |

Primary Examiner—Jack Cooper
Attorney, Agent, or Firm—Nixon & Vanderhye

[57] ABSTRACT

Disclosed herein are a process for producing acicular goethite particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution and/or an aqueous alkali carbonate solution based on $Fe^{2+}$ in said aqueous ferrous salt solution so as to oxidize said colloidal ferrous hydroxide or iron-containing colloidal precipitates and to produce acicular goethite nucleus particles, adding to the resultant aqueous ferrous salt reaction solution containing said acicular goethite nucleus particles not less than one equivalent of an aqueous alkali carbonate solution based on $Fe^{2+}$ in said aqueous ferrous salt reaction solution, and blowing an oxygen-containing gas into the mixed aqueous ferrous salt reaction solution so as to grow said goethite nucleus particles; and a process for producing acicular magnetic iron oxide particles by reducing the acicular goethite particles obtained in the above process to produce acicular magnetite particles, and if necessary, oxidizing the acicular magnetite particles to obtain acicular maghemite particles, and if necessary, modifying the acicular magnetite or maghemite particles with Co or Co and $Fe^{2+}$.

9 Claims, 4 Drawing Sheets

PROCESS FOR PRODUCING ACICULAR GOETHITE PARTICLES AND ACICULAR MAGNETIC IRON OXIDE PARTICLES

This is a division of application Ser. No. 07/733,724, filed Jul. 22, 1991, now abandoned.

BACKGROUND OF THE INVENTION

The present invention relates to acicular goethite particles and acicular magnetic iron oxide particles which have a uniform particle size distribution, are substantially free of dendrites, and have a large aspect ratio (major axial diameter/minor axial diameter) and an excellent coercive force distribution.

With progressing miniatirization and weight-reduction of magnetic recording and reproducing apparatuses in recent years, the necessity for a recording medium having a higher performance such as a magnetic tape and a magnetic disk has been increasing more and more. In other words, a magnetic recording medium is required to have a higher recording density, higher sensitivity and higher output characteristic. The magnetic characteristics of magnetic particles which are demanded in order to satisfy the above-mentioned requirements for the magnetic recording medium, are a high coercive force and an excellent dispersibility. In order to improve the sensitivity and the output of a magnetic recording medium, the magnetic particles must have as high a coercive force as possible. this fact is described in, for example, DEVELOPMENT OF MAGNETIC MATERIALS AND TECHNIQUE OF IMPROVING THE DISPERSION PROPERTY OF MAGNETIC POWDER (1982), published by K. K. Sogo Gijutsu Kaihatsu Center, p. 310: "Since the improvement of magnetic tapes has been directed toward a higher sensitivity and a higher output, it is an important point to enhance the coercive force of acicular $\gamma$-$Fe_2O_3$ particles, . . . "

In order to improve the recording density of a magnetic recording medium, the magnetic recording medium must have a high coercive force and a large residual magnetization (Br), as described in the said DEVELOPMENT OF MAGNETIC MATERIALS AND TECHNIQUE OF IMPROVING THE DISPERSION PROPERTY OF MAGNETIC POWDER. p. 312: "The condition for high-density recording in a coating-type tape is that it is possible to keep the high output characteristics with respect to a short-wavelength signal at a low noise level. For this purpose, it is necessary that both the coercive force (Hc) and the residual magnetization (Br) are large, and that the thickness of the coating film is thin". It is therefore necessary that the magnetic particles have a high coercive force and they are excellent in dispersibility in the vehicle, and orientation property and packing density in the coating film.

In order to enhance the output of a magnetic recording medium, it is required to have a small switching field distribution (hereinunder referred to as "S.F.D.") and hence, the magnetic particles are required to have a small width of coercive force distribution. This fact is described in Japanese Patent Application LaidOpen (KOKAI) No. 63-26821 (1988): "FIG. 1 is a graph showing the relationship between the S.F.D. of the above-described magnetic disk and the recording and reproducing output. . . . The relationship between the S.F.D. and the recording and reproducing output is linear, as is clear from FIG. 1. It indicates that the recording and reproducing output is enhanced by using ferromagnetic powder having a small S.F.D. That is, in order to obtain a large output, an S.F.D. of not more than 0.6 is necessary.

As well known, the coercive force of magnetic iron oxide particles depend upon the configurational anisotropy, crystalline anisotropy, strain anisotropy, exchange anisotropy, or the interaction thereof.

Acicular magnetite particles and acicular maghemite particles which are used as magnetic iron oxide particles at present show a relatively high coercive force by utilizing the anisotropy derived from their shapes, namely, by increasing the aspect ratio (major axial diameter/minor axial diameter).

The known acicular magnetic particles are obtained by reducing as a starting material goethite particles or hematite particle obtained by heat-treating the goethite particle at 280° to 450° C. in a reducing gas such as hydrogen, to form magnetite particles, or by further oxidizing the thus-obtained magnetite particles at 200° to 400° C. in air to form maghemite particles.

The known acicular magnetic iron oxide particles modified with Co or Co and Fe are obtained by dispersing acicular magnetite particles or acicular maghemite particles as the precursor particles in an alkaline suspension containing cobalt hydroxide or an alkaline suspension containing cobalt hydroxide and ferrous hydroxide so that 0.1 to 15.0 atomic% of Co based on Fe of the precursor particles is contained, and heat-treating the resultant dispersion.

The residual magnetization (Br) in a magnetic recording medium depends upon the dispersibility of the magnetic particle in the vehicle, and the orientation property and packing density of the magnetic particles in the coated film, and in order to improve these properties, the magnetic particles to be dispersed in the vehicle are required to have as large an aspect ratio (major axial diameter/minor axial diameter) as possible, a uniform particle size distribution and no inclusion of dendrites.

As described above, magnetic iron oxide particles which have a substantially uniform particle size distribution, which are substantially free of dendtritess and which have a large aspect ratio (major axial diameter/minor axial diameter) are now in the strongest demand. In order to obtain magnetic iron oxide particles provided with these properties, it is necessary that as the starting material goethite particles have a substantially uniform particle size, are substantially free of dendrites and have a large aspect ratio (major axial diameter/minor axial diameter). e.g. an aspect ratio of not less than 20.

As a method of producing goethite particles which are the starting material, the following methods are conventionally known: (1) a method of producing acicular goethite particles by oxidizing a suspension containing colloidal ferrous hydroxide which is obtained by adding not less than one equivalent of an aqueous alkali hydroxide solution to a ferrous salt solution, at a temperature of not more than 80° C. and pH of not less than 11 by blowing an oxygen-containing gas into the suspension (Japanese Patent Publication No. 39-5610 (1964)); (2) a method of producing spindle-shaped goethite particles by oxidizing a suspension containing $FeCO_3$ which is obtained by reacting an aqueous ferrous salt solution with an aqueous alkali carbonate solution, by blowing an oxygen-containing gas into the suspension (Japanese Patent Application Laid-Open (KOKAI) No. 50-80999 (1975)); and (3) a method of producing acicular goethite nucleus particles by oxidizing an aqueous ferrous salt solution containing a colloidal ferrous hydroxide or an iron carbonate which are respectively obtained by adding not more than one equivalent of an aqueous alkali hydroxide solution or an aqueous alkali carbonate solution to an aqueous ferrous salt solution, by blowing an oxygen-containing gas into the suspension, and then growing the goethite nucleus particles by adding to the thus-obtained aqueous ferrous salt solution containing the goethite nucleus particles not less than one equivalent of an aqueous alkali hydroxide solution based on $Fe^{2+}$ in the aqueous ferrous salt solution and blowing an oxygen-containing gas into the resultant aqueous ferrous salt solution for oxidization (Japanese Patent Publication No. 59-48766 (1984), Japanese Patent Application Laid-Open (KOKAI) Nos. 59-128293 (1984), 59-128294 (1984), 59-128295 (1984) and 60-21818 (1985)).

Although acicular magnetic iron oxide particles which have a uniform particle size distribution, which are substantially free of dendtritess, and which have a large aspect ratio. (major axial diameter/minor axial diameter) and excellent coercive force distribution are now in the strongest demand, the particles obtained by the method (1) of producing as a starting material goethite particles contain dendrites and cannot be said to have a uniform particle size distribution in-spite of the large aspect ratio (major axial diameter/minor axial diameter), particularly, an aspect ratio of not less than 10.

According to the method (2), although spindle-shaped particles having a uniform particle size distribution and being free of dendrites are produced, the aspect ratio (major axial diameter/minor axial diameter) thereof is not more than about 7. That is, the method (2) is defective in that it is difficult to produce particles having a large aspect ratio (major axial diameter/minor axial diameter). This phenomenon tends to be more prominent as the major axial diameter of the particles become smaller. Various attempts have been made to increase the aspect ratio (major axial diameter/minor axial diameter) of spindle-shaped goethite particles, but the actual aspect ratio (major axial diameter/minor axial diameter) obtained has been not more than about 17 to 18, which cannot be said satisfactory.

The object of the method (3) is to improve the properties such as particle size, aspect ratio (major axial diameter/minor axial diameter) and the presence or absence of dendrites of the acicular goethite particles produced by the method (1) or (2), but goethite particles produced by the method (3) can not be said to satisfy the demand for various properties have not been obtained yet.

Therefore, acicular magnetic iron oxide particles produced from as the starting material these goethite particles cannot be said to have a uniform particle size distribution, to be free of dendrites and to have a large aspect ratio (major axial diameter/minor axial diameter).

Accordingly, it is an object of the present invention to provide acicular goethite particles and acicular magnetic iron oxide particles which have a uniform particle size distribution, which are substantially free of dendrites, and which have a large aspect ratio (major axial diameter/minor axial diameter) and excellent coercive force distribution.

As a result of studies undertaken by the present inventors, it has been found that by blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution and/or an aqueous alkali carbonate solution based on $Fe^{2+}$ in the aqueous ferrous salt solution so as to oxidize the colloidal ferrous hydroxide or iron-containing colloidal precipitates and to produce acicular goethite nucleus particles, adding to the resultant aqueous ferrous salt reaction solution containing the acicular goethite nucleus particles not less than one equivalent of an aqueous alkali carbonate solution based on $Fe^{2+}$ in the aqueous ferrous salt reaction solution, and blowing an oxygen-containing gas into the mixed aqueous ferrous salt reaction solution so as to grow the goethite nucleus particles, the thus-obtained acicular goethite particles have a uniform particle size distribution, are substantially free of dendrites, and have a large aspect ratio (major axial diameter/minor axial diameter) and excellent coercive force distribution. On the basis of this finding, the present invention has been achieved.

SUMMARY OF THE INVENTION

In a first aspect of the present invention, there is provided a process for producing acicular goethite particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution and/or an aqueous alkali carbonate solution based on Fe2 + in the aqueous ferrous salt solution so as to oxidize the colloidal ferrous hydroxide or iron-containing colloidal precipitates and to produce acicular goethite nucleus particles; adding to the resultant aqueous ferrous salt reaction solution containing the acicular goethite nucleus particles not less than one equivalent of an aqueous alkali carbonate solution based on $Fe^{2+}$ in the aqueous ferrous salt reaction solution; and blowing an oxygen-containing gas into the mixed aqueous ferrous salt reaction solution so as to grow the acicular goethite nucleus particles.

In a second aspect of the present invention, there is provided a process for producing acicular magnetic iron oxide particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution and-/or an aqueous alkali carbonate solution based on $Fe^{2+}$ in the aqueous ferrous salt solution so as to oxidize the colloidal ferrous hydroxide or iron-containing colloidal precipitates and to produce acicular goethite nucleus particles; adding to the resultant aqueous ferrous salt reaction solution containing the acicular goethite nucleus particles not less than one equivalent of an aqueous alkali carbonate solution based on $Fe^{2+}$ in the aqueous ferrous salt reaction solution; blowing an oxygen-containing gas into the mixed aqueous ferrous salt reaction solution so as to grow the acicular goethite nucleus particles; and heat-treating in a reducing gas the thus-obtained acicular goethite particles or acicular hematite particles obtained by heat-treating the thus obtained acicular goethite particles at 300° to 700° C., thereby obtaining acicular magnetite particles; and, if necessary, oxidizing the acicular magnetite particles, thereby obtaining acicular maghemite particles.

In a third aspect of the present invention, there is provided a process for producing acicular magnetic iron oxide particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution and/or an aqueous alkali carbonate solution based on $Fe^{2+}$ in the aqueous ferrous salt solution so as to oxidize the colloidal ferrous hydroxide or iron-containing colloidal precipitates and to produce acicular goethite nucleus particles; adding to the resultant aqueous ferrous salt reaction solution containing the acicular goethite nucleus particles not less than one equivalent of an aqueous alkali carbonate solution based on $Fe^{2+}$ in the aqueous ferrous salt reaction solution; blowing an oxygen-containing gas into the mixed aqueous ferrous salt reaction solution so as to grow the acicular goethite nucleus particles; heat-treating in a reducing gas the thus obtained acicular goethite particles or acicular hematite particles obtained by heat-treating the thus-obtained acicular goethite particles at 300° to 700° C., thereby obtaining acicular magnetite particles; if necessary, further oxidizing the thus-obtained acicular magnetite particles, thereby obtaining acicular maghemite particles; dispersing the acicular magnetite particles or acicular maghemite particles as precursor particles in an alkaline suspension containing cobalt hydroxide or cobalt hydroxide and ferrous hydroxide so that the Co content in the suspension is 0.1 to 15.0 atomic % based on Fe of the precursor particles; and heat-treating the resultant aqueous dispersion, thereby producing acicular magnetite particles or acicular maghemite particles modified with Co or Co and $Fe^{2+}$.

DETAILED DESCRIPTION OF THE INVENTION

As an aqueous ferrous salt solution used in the present invention, an aqueous ferrous sulfate solution and an aqueous ferrous chloride solution may be used.

As an aqueous alkali hydroxide solution used for the reaction for producing acicular goethite nucleus particles in the present invention, an aqueous sodium hydroxide solution and an aqueous potassium hydroxide solution are usable. As an aqueous alkali carbonate solution, an aqueous sodium carbonate solution, an aqueous potassium carbonate solution and an aqueous ammonium carbonate solution are usable.

The amount of aqueous alkali hydroxide solution and]or aqueous alkali carbonate solution used in the present invention is less than one equivalent based on $Fe^{2+}$ in the aqueous ferrous salt solution. If it is not less than one equivalent, the goethite particles obtained have non-uniform particle size distribution and include dendrites and granular magnetite particles.

The amount of existent acicular goethite nucleus particles in the present invention is 10 to 90 mol % based on the total amount of goethite particles produced. If it is less than 10 mol %, it is difficult to obtain objective acicular goethite particles. If it exceeds 90 mol %, since the ratio of iron carbonate to the acicular goethite nucleus particles is decreased,the reaction becomes non-uniform and, hence, the particle size distribution of the goethite particles obtained becomes non-uniform.

As the aqueous alkali carbonate solution used for growing the acicular goethite nucleus particles, the same alkali carbonate as that used for the reaction for producing acicular goethite nucleus particles is usable.

The amount of aqueous alkali carbonate solution used is not less than one equivalent based on $Fe^{2+}$ in the residual aqueous ferrous salt solution. If it is less than one equivalent, the goethite particles obtained have non-uniform particle size distribution and include dendrites and spherical magnetite particles.

In the present invention, oxidization is carried out by blowing an oxygen-containing gas such as air into a liquid under mechanical stirring, if necessary.

The reaction temperature for producing goethite nucleus particles, the oxidization temperature and the reaction temperature for growing goethite nucleus particles in the present invention are not higher than 80° C., which is the temperature for generally producing goethite particles, preferably 30° to 60 ° C. If the temperature is higher than 80° C., granular magnetite particles are included in the acicular goethite particles.

Before the addition of the aqueous alkali carbonate solution, the thus obtained aqueous ferrous salt reaction solution containing the acicular goethite nucleus particles may be treated by any one of the following steps.

(1) To heat-treat the thus-obtained aqueous ferrous salt reaction solution containing the acicular goethite nucleus particles at a temperature of ,not less than 75° C., preferably 80° to 95 ° C. for not less than 0.5 hrs, preferably 1 to 2 hrs; and to cool the resultant aqueous ferrous salt reaction solution containing .the acicular goethite nucleus particles to a temperature of less than 60° C., preferably 30° to 55° C.

(2) To maintain the thus-obtained aqueous ferrous salt reaction solution containing the acicular goethite nucleus particles at a temperature of less than 60° C., preferably 40° to 55 ° C. in a non-oxidizing atmosphere for not less than 1 hr, preferably 2 to 5 hrs.

(3) To heat-treat the thus-obtained aqueous ferrous salt reaction solution containing the acicular goethite nucleus particles at a temperature of not less than 75° C., preferably 80° to 95 ° C. for not less than 0.5 hrs, preferably 1 to 2 hrs; to cool the resultant aqueous ferrous salt reaction solution containing the acicular goethite nucleus particles to the temperature of less than 60° C., preferably 30 to 55° C.; and to maintain the thus-obtained aqueous ferrous salt reaction solution containing the acicular goethite nucleus particles at a temperature of less than 60° C., preferably 40° to 50 ° C. in non-oxidizing atmosphere for not less than 1 hrs, preferably 2 to 5 hrs.

The magnetic iron oxide particles obtained through the above mentioned step (1), (2) or (3) have the following experior advantages as compared with those obtained by the basic process of the present invention without using the above-mentioned steps.

By the step (1), an orientation and squareness of the magnetic iron oxide particles obtained are further improved.

By the step (2), an S.F.D of the magnetic iron oxide particles obtained is further improved.

By the step (3), an orientation, a squareness and an S.F.D. of the magnetic iron oxide particles obtained are further improved.

The same reaction column may be used for both the reaction for producing goethite nucleus particles and the reaction for growing the goethite nucleus particles. It is also possible to obtain the objective goethite particles by using different reaction columns for these reactions.

It is possible in the present invention to add elements, for example, Co, Ni, Zn, Al, Si and P other than Fe, which are conventionally added in the process for producing goethite particles in order to improve various properties of magnetic particles. In this case, the same advantages are produced.

The acicular goethite particles are heat-treated at 300° to 700° C. so as to obtain acicular hematite particles.

The acicular goethite particles or acicular hematite particles are reduced at 280° to 450 ° C. in a reducing gas such as hydrogen.

The oxidization in the present invention is carried out at 200° to 500° C. by an ordinary method.

Co-modification (Co-coating) of the magnetic iron oxide particles in the present invention is carried out by an ordinary method. For example, the Co-modification is carried out by dispersing the precursor particles in an alkaline suspension containing cobalt hydroxide or cobalt hydroxide and ferrous hydroxide and heat-treating the dispersion at a temperature of 50° to 100 ° C., as described in, e.g., Japanese Patent Publication Nos. 52-24237 (1977), 52-24238 (1977), 52-36751 (1977) and 52-36863 (1977).

The cobalt hydroxide in the present invention is obtained by reacting an water-soluble cobalt salt such as cobalt sulfide and cobalt chloride with an aqueous alkali hydroxide solution such as an aqueous sodium hydroxide solution and an aqueous potassium hydroxide solution.

The ferrous hydroxide in the present invention is obtained by reacting a water-soluble ferrous salt such as ferrous sulfide and ferrous chloride with an aqueous alkali hydroxide solution such as an aqueous sodium hydroxide solution and an aqueous potassium hydroxide solution.

If the temperature is lower than 50° C., it is difficult to produce magnetite particles or maghemite particles modified (coated) with Co or Co and $Fe^{2+}$, and even if they are produced, a very long time for the Co-modification is required.

Since the modification arises in the form of a hydroxides of cobalt and ferrous, the modification is carried out under a non-oxidizing atmosphere in order to suppress an oxidization of cobalt and ferrous. The non-oxidizing atmosphere is preferably in the stream of an inert gas such as $N_2$ and argon.

The amount of water-soluble cobalt salt used for Co-modification in the present invention is 0.1 to 15.0 atomic % calculated as Co based on Fe of the precursor particles. If it is less than 0.1 atomic %, the coercive force of the acicular magnetite or maghemite particles produced is improved sufficiently. On the other hand, if it is more than 15.0 atomic %, the coercive force distribution of the acicular magnetite or maghemite particles produced is not improved sufficiently. In consideration of the coercive force and the coercive force distribution of the acicular magnetite particles or maghemite particles, the amount of water-soluble cobalt salt added is preferably 2.0 to 13.0 atomic %.

Almost the whole amount of water-soluble cobalt salt added is utilized for the modification of the surfaces of the magnetic iron oxide particles.

According to the present invention, when ① an oxygen-containing gas is blown into a ferrous salt reaction solution containing colloidal ferrous hydroxide or iron-containing colloidal precipitates which is obtained by reacting an aqueous ferrous salt solution with less than one equivalent of an aqueous alkali hydroxide solution and/or an aqueous alkali carbonate solution based on $Fe^{2+}$ in the aqueous ferrous salt solution so as to oxidize the colloidal ferrous hydroxide or iron-containing colloidal precipitates and to produce acicular goethite nucleus particles; ② not less than one equivalent of an aqueous alkali carbonate solution based on $Fe^{2+}$ in the aqueous ferrous salt reaction solution is then added to the aqueous ferrous salt reaction solution containing the acicular goethite nucleus particles; and ③ an oxygen-containing gas is finally blown into the mixed aqueous ferrous salt reaction solution so as to grow the acicular goethite nucleus particles in the neutral region (pH of 9 to 10), it is possible to obtain acicular goethite particles which have a uniform particle size, which are free of dendrites and which have a large aspect ratio (major axial diameter/minor axial diameter), in particular, an aspect ratio of not less than 20, and also it is possible to obtain acicular magnetic iron oxide particles from the acicular goethite particles as a starting material, which have a uniform particle size distribution, which are substantially free of dendrites and which have a large aspect ratio (major axial diameter/minor axial diameter). These acicular magnetic iron oxide particles having these properties are also excellent in the coercive force distribution.

In contrast, in the case of using an aqueous alkali hydroxide solution in place of an aqueous alkali carbonate solution for the reaction for growing the goethite nucleus particles, or in the case of using not less than one equivalent of an aqueous alkali hydroxide solution or an aqueous alkali carbonate solution, it is very difficult to obtain the objective acicular goethite particles which have a uniform particle size distribution, which are free of dendrites and which have a large aspect ratio (major axial diameter/minor axial diameter).

The thus-obtained acicular goethite particles according to the present invention have a major axial diameter of not less than 0.1 μm, preferably 0.15 to 0.4 μm, an aspect ratio (major axial diameter/minor axial diameter) of not less than 20, preferably 22 to 35, and a particle size distribution (a geometric standerd deviation ($\sigma g$) of not less than 0.6, preferably 0.7 to 0.9.

The acicular magnetite particles according to the present invention have a major axial diameter of not less than 0.1 μm, preferably 0.12 to 0.4 μm, an aspect ratio (major axial diameter/minor axial diameter) of not less than 6.5, preferably 6.7 to 9.0, a particle size distribution (geometric standard deviation ($\sigma g$)) of not less than 0.6, preferably 0.62 to 0.80.

The acicular maghemite particles according to the present invention have a major axial diameter of not less than 0.1 pro, preferably 0.12 to 0.4 μm, an aspect ratio (major axial diameter/minor axial diameter) of not less than 6.5, preferably 6.6 to 8.0, a particle size distribution (geometric standard deviation ($\sigma g$)) of not less than 0.6, preferably 0.62 to 0.80.

The acicular magnetite particles modified with Co or Co and $Fe^{2+}$ according to the present invention have a major axial diameter of not less than 0.1 μm, preferably 0.12 to 0.4 μm, an aspect ratio (major axial diameter/minor axial diameter) of not less than 5.5, preferably 5.8 to 7.5, a particle size distribution (geometric standard deviation ($\sigma g$)) of not less than 0.55, preferably 0.59 to 0.75, and contain 0.1 to 15 atomic % of Co based on Fe of the precursor particles and 0 to 20 atomic % of coated $Fe^{2+}$ based on Fe of the precursor particles.

The acicular maghemite particles modified with Co or Co and $Fe^{2+}$ according to the present invention have a major axial diameter of not less than 0.1 μm, preferably 0.11 to 0.4 μm, an aspect ratio (major axial diameter/minor axial diameter) of not less than 5.5, preferably 5.6 to 7.5, a particle size distribution (geometric standard deviation ($\sigma g$)) of not less than 0.55, preferably 0.58 to 0.75, and contain 0.1 to 15.0 atomic % of Co based on Fe of the precursor particles and 0 to 20 atomic % of coated $Fe^{2+}$ based on Fe of the precursor particles.

According to the process for producing acicular goethite particles, it is possible to obtain acicular goethite particles which have a uniform particle size, which are substantially free of dendrites and which have a large aspect ratio (major axial diameter/minor axial diameter).

The magnetic iron oxide particles obtained from the acicular goethite particles as a raw material in accordance with the present invention also have a uniform particle size, are substantially free of dendrites, and have a large aspect ratio (major axial diameter/minor axial diameter) and excellent coercive force distribution, so that they are suitable as magnetic particles for high-density, high-sensitivity and high-output recording.

EXAMPLES

The present invention will be explained in more detail while referring to the following non-limitative examples.

The major axial diameter and the aspect ratio (major axial diameter/minor axial diameter) in each of the following examples and comparative examples are expressed by the average values of the values obtained by measuring in the electron micrographs.

The particle size distribution is expressed by the geometric standard deviation ($\sigma g$). the major axial diameters of 350 particles were measured from electron micrographs (x 120,000) and the actual major axial diameters were calculated from the measured values. A cumulative mount (%) obtained from the number of the particles belonging to each regular interval of the particle diameter was plotted in a logarithmicro-normal probability paper with particle diameter (μm) as abscissa and cumulative amount (%) as ordinate in accordance with a statistical method from the actual particle diameter and the number of the particles. A particle diameter ($DS_{50}$) when the cumulative amount is 50% and a particle diameter ($D_{84.13}$) when the cumulative amount is 84,13%, were read out of the obtained lognomal distribution graph. The geometric standard deviation ($\sigma g$) was found by dividing the particle diameter ($D_{50}$) by the particle diameter ($D_{84,13}$) [$\sigma g = D_{50}/D_{84,13}$].

The magnetic characteristics and the coating film properties of the magnetic iron oxide particles were measured by using a "sample vibrating type magnetometer VSM-3S-15" (produced by Toei Kogyo K. K.) and applying an external magnetic field up to 5 KOe in case of acicular magnetite particles and acicular maghemite particles, or an external magnetic field up to 10 KOe in case of acicular magnetic iron oxide particles modified with Co or Co and $Fe^{2+}$.

A sheet-like sample obtained by a method shown in later-described Example 79 was used for measuring the squareness and the S.F.D. of the coating film. The S.F.D. was measured by using a differentiation circuit of the above-described magnetometer to obtain the differentiation curve of the demagnetizing curve of the magnetism hysteresis curve, measuring a half-width value of the curve and dividing the half-width value by the coercive force.

PRODUCTION OF ACICULAR GOETHITE PARTICLES

Examples 1 to 8

Comparative Example 1 to 6

Example 1

12.8 l of an aqueous ferrous sulfide solution containing 1.50 mol/l of $Fe^{2+}$ and 30.2 l of 0.44-N aqueous NaOH solution (the content of NaOH corresponds to 0.35 equivalent based on $Fe^{2+}$ in the aqueous ferrous sulfide solution) were mixed to produce at 38° C. at pH 6.7 an aqueous ferrous sulfide solution containing Fe(OH)$_2$.

Figure 1:
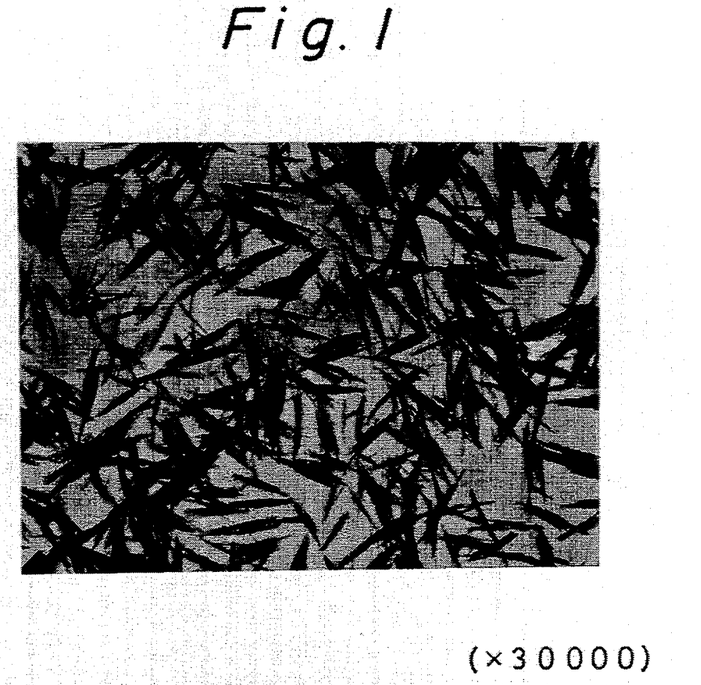
FIG. 1 is an electron micrograph (x 30000) of the particle structure of the acicular goethite nucleus particles obtained in example 1.

Air was blown into the aqueous ferrous sulfide solution containing Fe(OH)$_2$ at a rate of 130 l per minute at 40° C. for 3.0 hours, thereby producing goethite nucleus particles. A part of the reaction solution was extracted, filtered out, washed with water and dried by an ordinary method. The electron micrograph (x 30000) of the particles obtained is shown in FIG. 1.

To the aqueous ferrous sulfide solution containing the goethite nucleus particles (the mount of existent goethite nucleus particles corresponds to 35 mol % based on the amount of goethite particles produced) were added 7.0 l of 5.4-N aqueous Na$_2$CO$_3$ solution (the content of Na$_2$CO$_3$ corresponds to 1.5 equivalents based on $Fe^{2+}$ in the residual aqueous ferrous sulfide solution). Air was blown into the resultant solution at a rate of 130 l per minute at 42° C. at pH 9.4 for 4 hours, thereby producing goethite particles. The goethite particles produced were filtered out, washed with water and dried by an ordinary method.

Figure 2:
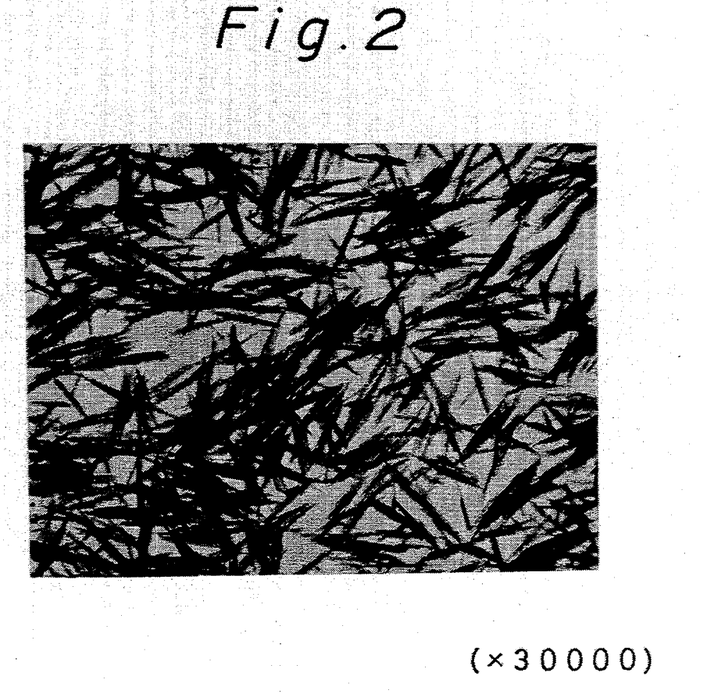
FIG. 2 is an electron micrograph (x 30000) of the particle structure of the acicular goethite particles obtained in Example 1.

The goethite particles produced were acicular particles having a uniform particle size distribution (geometric standerd deviation ($\sigma g$) of 0.801), including no dendrites and having an average major axial diameter of 0.33 μm and an aspect ratio (major axial diameter/minor axial diameter) of 25, as shown in the electron micrograph (x 30000) in FIG. 2.

Examples 2 to 8

Goethite particles were produced in the same way as in Example 1 except for varying the kind, $Fe^{2+}$ content and amount of aqueous ferrous salt solution used, the kind, concentration and mount of aqueous alkaline solution used, the kind and amount of additional element, and the reaction temperature in the process for producing goethite nucleus particles; and the kind, concentration and amount of aqueous alkaline solution used, the kind and amount of additional element and the reaction temperature in the process for growing the goethite nucleus particles.

The main conditions for production and the properties of the goethite particles obtained are shown in Tables 1 and 2.

Any of the acicular goethite particles obtained in Examples 2 to 8 had a uniform particle size distribution and no inclusion of dendrites.

Examples 9 and 10

Goethite particles were produced in the same way as in Example 1 except for inserting the following steps before the addition of the aqueous alkali carbonate solution.

The thus-obtained aqueous ferrous sulfide solution containing the goethite nucleus particles was heat-treated under the condition shown in Table 1 and the cooled to 45 °C.

Examples 11 to 13

Goethite particles were produced in the same way as in Example 1 except for inserting the following step before the addition of the aqueous alkali carbonate solution.

The thus-obtained aqueous ferrous sulfide solution containing the goethite nucleus particles was maintained under the condition shown in Table 1.

Example 14

Goethite particles were produced in the same way as in Example 1 except for inserting the following steps before the addition of the aqueous alkali carbonate solution.

The thus-obtained aqueous ferrous sulfide solution containing the goethite nucleus particles was heat-treated at a temperature of 90 °C. for 1 hrs, cooled to a temperature of 45 °C. and maintained at the same temperature for 2 hrs in the stream of $N_2$ gas.

The main condition for production and properties of the goethite particles obtained in Examples 9 to 14 are shown in Tables 1 and 2.

Any of the acicular goethite particles obtained in Examples 9 to 14 had a uniform particle size distribution and no inclusion of dendrites.

Comparative Example 1

Goethite particles were produced in the same way as in Example 1 except for using 7.0 l of 5.4-N aqueous NaOH solution (the content of NaOH corresponds to 1.5 equivalents based on $Fe^{2+}$ in the residual aqueous ferrous sulfide solution) in place of 7.0 l of 5.4-N aqueous $Na_2CO_3$ solution.

Figure 3:
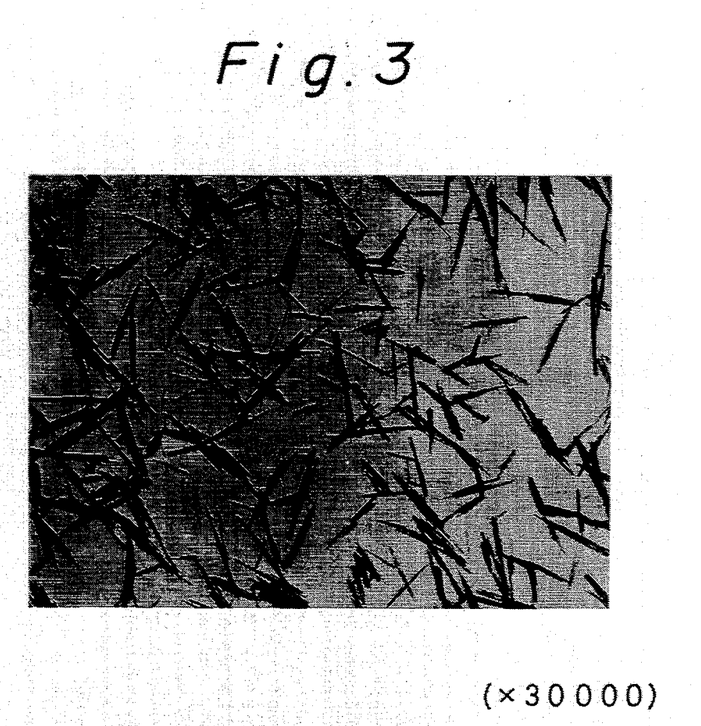
FIG. 3 is an electron micrograph (x 30000) of the particle structure of the acicular goethite particles obtained in comparative Example 1.

The particle size distribution of the acicular goethite particles obtained was non-uniform as expressed by a geometric standerd deviation ($\sigma g$) of 0.511 and dendrites were included therein, as shown in the electron micrograph (x 30000) in FIG. 3.

Comparative Example 2

Goethite particles were produced in the same way as in Example I except for using 30.2 l of 0.44-N aqueous $Na_2CO_3$ solution (the content of $Na_2CO_3$ corresponds to 0.35 equivalent based on $Fe^{2+}$ in the aqueous ferrous sulfide solution) in place of 30.2 l of 0.44-N aqueous NaOH solution, and 7.0 l of 5.4-N aqueous NaOH solution (the content of NaOH corresponds to 1.5 equivalents based on $Fe^{2+}$ in the residual aqueous ferrous sulfide solution) in place of 7.0 l of 5.4-N aqueous $Na_2CO_3$ solution.

Figure 4:
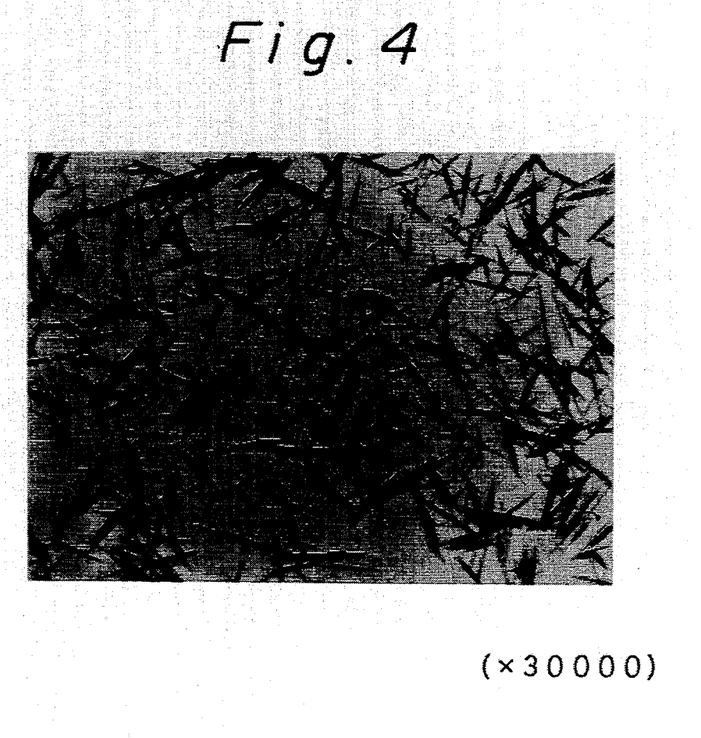
FIG. 4 is an electron micrograph (x 30000) of the particle structure of the acicular goethite particles obtained in Comparative Example 2.

The particle size distribution of the acicular goethite particles obtained was non-uniform as expressed by a geometric standerd deviation ($\sigma g$) of 0.516 and dendrites were included therein, as shown in the electron micrograph (x 30000) in FIG. 4.

Comparative Example 3

7.5 l of an aqueous ferrous sulfide solution containing 1.0 mol/l of $Fe^{2+}$ and 24.2 l of 1.3-N aqueous $Na_2CO_3$ solution (the content of $Na_2CO_3$ corresponds to 2.1 equivalents based on $Fe^{2+}$ in the aqueous ferrous sulfide solution) were mixed to produce $FeCO_3$ at 42° C. at pH 9.9. Air was blown into the aqueous solution containing $FeCO_3$ at a rate of 100 l per minute at 45° C. for 5 hours, thereby producing spindle-shaped goethite particles.

To the aqueous solution containing the spindle-shaped goethite particles were added 8.3 l of an aqueous ferrous sulfide solution containing 1.8 mol/l of $Fe^{2+}$ and 10 l of 13-N aqueous NaOH solution (the content of NaOH corresponds to 4.4 equivalents based on $Fe^{2+}$ in the aqueous ferrous sulfide solution added), and the resultant solution were stirred and mixed (the amount of spindle-shaped goethite particles corresponds to 33 mol % of the amount of goethite particles produced). Air was blown into the resultant mixed solution at a rate of 150 l per minute at 50° C. for 3 hours.

The goethite particles produced were filtered out, washed with water and dried by an ordinary method.

Figure 5:
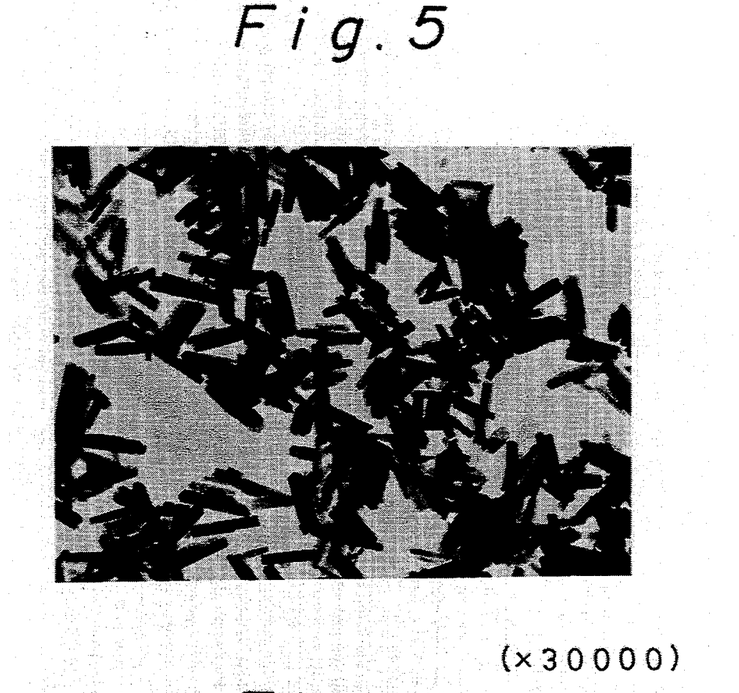
FIG. 5 is an electron micrograph (x 30000) of the particle structure of the goethite particles obtained in Comparative Example 3.

The goethite particles produced had a uniform particle size distribution (geometric standerd deviation ($\sigma g$) of 0.841) and included no dendrites, but they had a small aspect ratio (major axial diameter/minor axial diameter) and took a strip shape, as shown in the electron micrograph (x 30000) in FIG. 5.

Comparative Example 4

12.8 l of an aqueous ferrous sulfide solution containing 1.3 mol/l of $Fe^{2+}$ and 30.2 l of 2.4-N aqueous NaOH solution (the content of NaOH corresponds to 2.2 equivalents based on $Fe^{2+}$ in the aqueous ferrous sulfide solution) were mixed to produce $Fe(OH)_2$ at 40° C. at pH 13.2. Air was blown into the aqueous solution containing $Fe(OH)_2$ at rate of 130 l per minute at 45° C. for 15 hours, thereby producing acicular goethite particles. The goethite particles produced were filtered out and washed with water by an ordinary method.

To 27.5 l of the aqueous solution containing 586 g of the acicular goethite particles were added 12.5 l of an aqueous ferrous sulfide solution containing 1.0 mol/l of $Fe^{2+}$ and 10 l of 3.8-N aqueous $Na_2CO_3$ solution (the content of $Na_2CO_3$ corresponds to 1.5 equivalents based on $Fe^{2+}$ in the aqueous ferrous sulfide solution added), and the resultant solution were stirred and mixed (the mount of acicular goethite particles corresponds to 35 mol % of the mount of goethite particles produced). Air was blown into the resultant mixed solution at a rate of 130 l per minute at 42° C. for 4 hours.

The goethite particles produced were filtered out, washed with water and dried by an ordinary method.

The particle size distribution of the goethite particles obtained was non-uniform as expressed by a geometric standerd deviation ($\sigma g$) of 0.512, dendrites were included therein and the aspect ratio (major axial diameter/minor axial diameter) was as small as 10.

Comparative Example 5

10 l of an aqueous ferrous sulfide solution containing 1.5 mol/l of $Fe^{2+}$ and 33 l of 1-N aqueous NaOH solution (the content of NaOH corresponds to 2.3 equivalents based on $Fe^{2+}$ in the aqueous ferrous sulfide solution) were mixed to produce colloidal $Fe(OH)_2$ at 38° C. at pH 13. Air was blown into the suspension containing the colloidal $Fe(OH)_2$ at a rate of 13 l per minute at 42° C. for 15 hours, thereby producing acicular goethite particles. The goethite particles produced were filtered out, washed with water and dried by an ordinary method.

Figure 6:
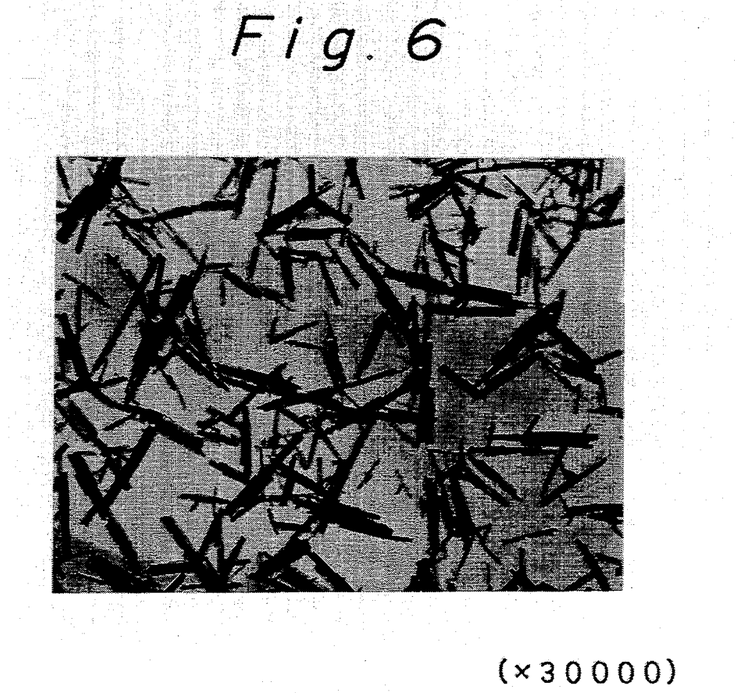
FIG. 6 is an electron micrograph (x 30000) of the particle structure of the goethite particles obtained in Comparative Example 5.

The particle size distribution of the goethite particles obtained was non-uniform as expressed by a geometric standerd deviation ($\sigma g$) of 0.510 and dendrites were included therein, as shown in the electron micrograph (× 30000) in FIG. 6.

Comparative Example 6

10 l of an aqueous ferrous sulfide solution containing 1.5 mol/l of $Fe^{2+}$ and 33 l of 1.8-N aqueous solution $Na_2CO_3$ (the content of $Na_2CO_3$ corresponds to 2.0 equivalents based on $Fe^{2+}$ in the aqueous ferrous sulfide solution) were mixed to produce $FeCO_3$ at 45° C. at pH 9.8. Air was blown into the aqueous solution containing $FeCO_3$ at a rate of 100 l per minute at 50° C. for 5 hours, thereby producing goethite particles. The goethite particles produced were filtered out, washed with water and dried by an ordinary method.

Figure 7:
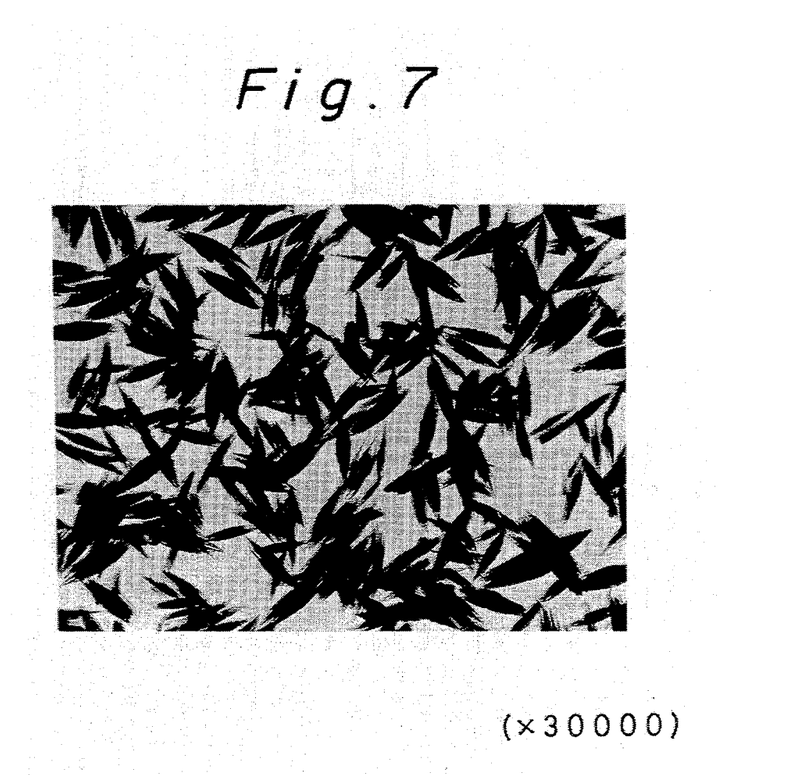
FIG. 7 is an electron micrograph (x 30000) of the particle structure of the goethite particles obtained in Comparative Example 6.

The goethite particles obtained were spindle-shape (a geometric standerd deviation ($\sigma g$) of 0.829) and the aspect ratio (major axial diameter/minor axial diameter) was as small as 7, as shown in the electron micrograph (× 30000) in FIG. 7.

PRODUCTION OF ACICULAR MAGNETITE PARTICLES

Examples 15 to 28

Comparative Examples 7 to 12

Example 15

5.3 Kg of the paste of the acicular goethite particles (corresponding to about 1.6 Kg of acicular goethite particles) obtained in Example 1 were suspended in 28 l of water. The pH of the suspension was 8.0. Thereafter, 240 ml of an aqueous solution containing 24 g of sodium hexametaphosphate (corresponding to 1.15 wt % calculated as $PO_3$ based on the acicular goethite particles) was added to the suspension, and the resultant mixture was stirred for 30 minutes. The resultant suspension was filtered and dried to obtain acicular goethite particles with the surfaces coated with a P compound. The thus-obtained acicular goethite particles coated with a P compound were heat-treated in air at 320° C., thereby obtaining acicular hematite particles coated (modified) with a P compound.

1000 g of the thus-obtained acicular hematite particles coated with a P compound were charged into a retort reducing vessel, and $H_2$ gas was blown into the particles at a rate of 2 l per minute while rotating the vessel to reduce them at 360° C., thereby obtaining acicular magnetite particles coated with a P compound.

It was observed through an electron microscope that the acicular magnetite particles coated with a P compound had an average major axial diameter of 0.25 μm and an aspect ratio (major axial diameter/minor axial diameter) of 7.5, and that the particle size distribution was uniform as expressed by a geometric standard deviation ($\sigma_g$) of 0.67 and no dendrites were included. When the magnetic characteristics were measured, a coercive force (Hc) was 400 Oe and a saturation magnetization ($\sigma_s$) was 82.7 emu/g.

Examples 16 to 28, Comparative Examples 7 to 12

Acicular magnetite particles were obtained in the same way as in Example 15 except for varying the kind of the starting material and the heating temperature for the heat-treatment in air. The main conditions for production and the properties of the acicular magnetite particles obtained are shown in Table 3.

As a result of observation through an electron microscope, any of the acicular magnetite particles obtained in Examples 16 to 28 proved to have a uniform particle size distribution and no inclusion of dendrites.

PRODUCTION OF ACICULAR MAGHEMITE PARTICLES

Examples 29 to 42

Comparative Examples 13 to 18

Example 29

300 g of the acicular magnetite particles coated with a P compound obtained in Example 15 were oxidized in air at 300° C. for 60 minutes to obtain acicular maghemite particles coated with a P compound.

It was observed through an electron microscope that the acicular maghemite particles coated with a P compound had an average major axial diameter of 0.24 μm and an aspect ratio (major axial diameter/minor axial diameter) of 7.4, and that the particle size distribution was uniform as expressed by a geometric standard deviation ($\sigma g$) of 0.66 and no dendrites were included. When the magnetic characteristics were measured, a coercive force (Hc) was 371 Oe and a saturation magnetization ($\sigma_s$) was 72.2 emu/g.

Examples 30 to 42, Comparative Examples 13 to 18

Acicular maghemite particles were obtained in the same way as in Example 29 except for varying the kind of acicular magnetite particles. The main conditions for production and the properties of the maghemite particles obtained are shown in Table 4. As a result of observation through an electron microscope, any of the acicular maghemite particles obtained in Examples 30 to 42 proved to have a uniform particle size distribution and no inclusion of dendrites.

PRODUCTION OF ACICULAR CO-MODIFIDED MAGNETITE PARTICLES

Examples 43 to 60

Comparative Examples 19 to 24

Example 43

100 g of the acicular magnetite particles coated with a P compound obtained in Example 15 were charged into 1.0 l of water with 0.085 mol of cobalt and 0.179 tool of ferrous iron dissolved therein by using cobalt sulfate and ferrous sulfate while preventing the inclusion of air as much as possible, and dispersed until the dispersion became a fine slurry. Into the dispersion, 102 ml of 18-N aqueous NaOH solution was poured and water was further added so as to form 1.3 l of a dispersion in which the hydroxyl concentration was 1.0 mol/l. The temperature of the dispersion was raised to 100° C.

and it was stirred for 5 hours. Thereafter, the slurry was taken out, washed with water, filtered out and dried at 60° C. to obtain acicular Co-modified magnetite particles.

As a result of observation through an electron microscope, it was proved that the acicular maghemite particles obtained had the same configuration and the particle size as the precursor particles, namely, the acicular magnetite particles coated with a P compound, an average major axial diameter of 0.23 μm and an aspect ratio (major axial diameter/minor axial diameter) of 6.7. The particle size distribution thereof was uniform as expressed by a geometric standard deviation ($\sigma g$) of 0.62. When the magnetic characteristics were measured, a coercive force (Hc) was 825 Oe and a saturation magnetization as was 84.6 emu/g.

Examples 44 to 60, Comparative Examples 19 to 24

Acicular magnetite particles modified by Co or Co and $Fe^{2+}$ were obtained in the same way as in Example 43 except for varying the kind of precursor particles and the amounts of Co added and $Fe^{2+}$ added under conditions that the amount of precursor magnetite particles was 100 g and the whole volume of the dispersion was 1.3 l.

The main conditions for production and the properties of the particles obtained are shown in Table 5.

PRODUCTION OF ACICULAR CO-MODIFIDE MAGHEMITE PARTICLES

Examples 61 to 78

Comparative Examples 25 to 30

Example 61

100 g of acicular maghemite particles with the surfaces coated with a P compound obtained in Example 29 were charged into 1.0 l of water with 0.085 mol of cobalt and 0.179 mol of ferrous iron dissolved therein by using cobalt sulfate and ferrous sulfate while preventing the inclusion of air as much as possible, and dispersed until the dispersion became a fine slurry. Into the dispersion, 102 ml of 18-N aqueous NaOH solution was poured and water was further added so as to form 1.3 l of dispersion in which the hydroxyl concentration was 1.0 mol/l. The temperature of the dispersion was raised to 100° C. and it was stirred for 5 hours. Thereafter, the slurry was taken out, washed with water, filtered out and dried at 60° C. to obtain acicular Co-modified maghemite particles.

As a result of observation through an electron microscope, it was proved that the particles obtained had the same configuration and the particle size as the precursor particles, namely, the acicular maghemite particles with the surfaces coated with a P compound, an average major axial diameter of 0.22 μm and an aspect ratio (major axial diameter/minor axial diameter) of 6.6. The particle size distribution thereof was uniform as expressed by a geometric standard deviation ($\sigma g$) of 0.63. When the magnetic characteristics were measured, a coercive force (Hc) was 790 Oe and a saturated magnetization ($\sigma_s$) was 77.0 emu/g.

Examples 62 to 78, Comparative Examples 25 to 30

Acicular maghemite particles modified by Co or Co and $Fe^{2+}$ were obtained in the same way as in Example 61 except for varying the kind of the precursor particles, the amounts of Co added, Fe(II) added and NaOH added and the treating temperature and time under conditions that the mount of precursor acicular maghemite particles .was 100 g and the whole volume of the dispersion was 1.3 l The main conditions for production and the properties of the particles obtained are shown in Table 6.

PRODUCTION OF MAGNETIC TAPE

Examples 79 to 142

Comparative Examples 31 to 54

Example 79

A magnetic tape was produced in the following manner. A magnetic coating was prepared by charging the acicular magnetic iron oxide particles coated with a P compound obtained in Example 15, the resin and the solvents described below into a 140-cc glass bottle in the following ratio, and mixing and dispersing the above materials by a paint conditioner for 2 hours. The magnetic coating was applied to a polyethylene terephthalate film (25 μm in thickness) to a thickness of 40 μm by an applicator, and the film was then oriented and dried in a magnetic field of 1450 Gauss.

| | |
|---|---|
| Glass beads of 1.5 mm in diameter | 100 g |
| Acicular magnetite particles | 15 g |
| Toluene | 5.6 g |
| Phosphate ester (GAFAC RE-610, produced by Toho Chemical Industrial Co., Ltd.) | 0.6 g |
| Lecithin | 0.6 g |
| Vinyl chloride-vinyl acetate copolymer (Vinilite VAGH, produced by Union Carbide) | 3.75 g |
| Butadiene acrylonitrile rubber (Hycar 1432 J, produced by Japan Geon Co., Ltd.) | 0.75 g |
| Mixed solution of Methyl isobutyl ketone, methyl ethyl ketone and toluene (3:1:1) | 40.5 g |

The magnetic tape produced had an S.F.D. of 0.44, a coercive force (Hc) of 369 Oe, a residual flux density (Br) of 1630 Gauss and a squareness (Br/Bm) of 0.82.

Examples 80 to 142, Comparative Example 31 to 54

Magnetic tapes were produced in the same way as in Example 79 except for varying the kind of magnetic particles. The acicular maghemite particles were oriented in a magnetic field of 1450 Gauss and the acicular Co-modified magnetic iron oxide particles were oriented in a magnetic field of 1900 Gauss. The properties of the magnetic tapes obtained are shown in Tables 7 to 10.

TABLE 1

| | Production of goethite nucleus particles ||||||||||
| | Aqueous ferrous salt solution ||| Aqueous alkaline solution |||||||
| | | | | | | Amount CO₃Fe or 2OH/Fe | Additional element || | |
| Examples | Kind | $Fe^{2+}$ content (mol/l) | Amount (l) | Kind | Concentration (N) | (l) | (equivalent ratio) | Kind | Amount M/Fe (mol %) | pH for mixing | Reaction temperature (°C.) |
|---|---|---|---|---|---|---|---|---|---|---|---|
| Example 1 | FeSO₄ | 1.5 | 12.8 | NaOH | 0.44 | 30.2 | 0.35 | — | — | 6.7 | 40 |
| Example 2 | FeSO₄ | 0.71 | 38.0 | NaOH | 6.6 | 5.0 | 0.61 | P | 0.80 | 7.2 | 42 |
| Example 3 | FeCl₂ | 1.5 | 12.8 | KOH | 0.54 | 30.2 | 0.42 | — | — | 6.8 | 40 |

TABLE 1-continued

| | | | | | | | | | | | |
|---|---|---|---|---|---|---|---|---|---|---|---|
| Example 4 | FeSO₄ | 1.5 | 12.8 | Na₂CO₃ | 0.36 | 30.2 | 0.28 | — | — | 6.6 | 36 |
| Example 5 | FeSO₄ | 0.54 | 38.0 | NaOH | 4.4 | 5.0 | 0.54 | P<br>Zn | 0.90<br>2.0 | 7.2 | 40 |
| Example 6 | FeCl₂ | 1.5 | 12.8 | NaOH | 0.51 | 30.2 | 0.40 | Ni | 0.5 | 6.8 | 40 |
| Example 7 | FeSO₄ | 1.5 | 12.8 | KOH | 0.40 | 30.2 | 0.31 | Zn | 1.5 | 6.6 | 40 |
| Example 8 | FeSO₄ | 1.5 | 12.8 | NaOH | 0.51 | 30.2 | 0.40 | — | — | 6.7 | 40 |
| Example 9 | FeSO₄ | 1.5 | 12.8 | NaOH | 0.60 | 32.0 | 0.50 | — | — | 7.2 | 40 |
| Example 10 | FeSO₄ | 1.5 | 12.8 | NaOH | 0.54 | 32.0 | 0.45 | — | 0.28 | 7.0 | 35 |
| Example 11 | FeSO₄ | 0.54 | 38.0 | NaOH | 4.4 | 4.7 | 0.50 | — | 0.28 | 7.3 | 40 |
| Example 12 | FeSO₄ | 1.5 | 12.8 | NaOH | 0.54 | 39.1 | 0.55 | — | 0.28 | 7.3 | 45 |
| Example 13 | FeCl₂ | 0.77 | 25.0 | KOH | 0.66 | 23.3 | 0.40 | — | 0.28 | 7.1 | 40 |
| Example 14 | FeSO₄ | 1.5 | 12.8 | NaOH | 0.54 | 35.5 | 0.50 | — | 0.28 | 7.2 | 40 |

| | Heat-treatment | | | Aging-treatment | | |
|---|---|---|---|---|---|---|
| Examples | Temperature (°C.) | Time (hr) | Atmosphere | Temperature (°C.) | Time (hr) | Atmosphere |
| Example 1 | — | — | — | — | — | — |
| Example 2 | — | — | — | — | — | — |
| Example 3 | — | — | — | — | — | — |
| Example 4 | — | — | — | — | — | — |
| Example 5 | — | — | — | — | — | — |
| Example 6 | — | — | — | — | — | — |
| Example 7 | — | — | — | — | — | — |
| Example 8 | — | — | — | — | — | — |
| Example 9 | 80 | 1 | Air | — | — | N₂ |
| Example 10 | 80 | 1.5 | Air | — | — | N₂ |
| Example 11 | — | — | — | 45 | 2 | N₂ |
| Example 12 | — | — | — | 40 | 3 | N₂ |
| Example 13 | — | — | — | 45 | 2 | N₂ |
| Example 14 | 90 | 1 | N₂ | 45 | 2 | N₂ |

TABLE 2

| | Growth of goethite nucleus particles | | | | | | | Goethite particles | | | |
|---|---|---|---|---|---|---|---|---|---|---|---|
| | | Aqueous alkaline solution | | | Additional element | | | | | | |
| | Goethite nucleus particles | | Concentration | Amount | CO₃/Fe (equivalent ratio) | | Amount M/Fe | | Reaction temperature | Major axial diameter | Aspect ratio (major axial diameter/minor axial diameter) | | Particle size distribution |
| Examples | (mol %) | Kind | (N) | (l) | | Kind | (mol %) | pH | (°C.) | (μm) | | Shape | |
| Example 1 | 35 | Na₂CO₃ | 5.4 | 7 | 1.5 | — | — | 9.4 | 42 | 0.33 | 25 | Acicular | 0.801 |
| Example 2 | 61 | Na₂CO₃ | 5.3 | 7 | 1.5 | — | — | 9.5 | 42 | 0.30 | 28 | " | 0.810 |
| Example 3 | 42 | K₂CO₃ | 4.2 | 7 | 1.3 | Co | 2.0 | 9.4 | 45 | 0.36 | 25 | " | 0.795 |
| Example 4 | 28 | Na₂CO₃ | 5.9 | 7 | 1.5 | — | — | 9.6 | 45 | 0.27 | 22 | " | 0.804 |
| Example 5 | 54 | Na₂CO₃ | 4.8 | 7 | 1.5 | — | — | 9.4 | 42 | 0.20 | 25 | " | 0.792 |
| Example 6 | 40 | K₂CO₃ | 5.0 | 7 | 1.5 | — | — | 9.5 | 42 | 0.35 | 23 | " | 0.790 |
| Example 7 | 31 | Na₂CO₃ | 5.8 | 7 | 1.5 | — | — | 9.6 | 50 | 0.32 | 23 | " | 0.787 |
| Example 8 | 40 | Na₂CO₃ | 5.6 | 7 | 1.7 | Al | 1.0 | 9.4 | 45 | 0.35 | 20 | " | 0.791 |
| Example 9 | 50 | Na₂CO₃ | 4.7 | 7 | 1.7 | — | — | 9.6 | 45 | 0.37 | 32 | " | 0.792 |
| Example 10 | 45 | Na₂CO₃ | 4.8 | 7 | 1.6 | — | — | 9.5 | 48 | 0.25 | 24 | " | 0.800 |
| Example 11 | 50 | Na₂CO₃ | 4.4 | 7 | 1.5 | — | — | 9.4 | 42 | 0.30 | 29 | " | 0.830 |
| Example 12 | 55 | Na₂CO₃ | 3.7 | 7 | 1.5 | — | — | 9.4 | 40 | 0.22 | 25 | " | 0.842 |
| Example 13 | 40 | K₂CO₃ | 5.3 | 7 | 1.6 | — | — | 9.5 | 40 | 0.36 | 32 | " | 0.825 |
| Example 14 | 50 | Na₂CO₃ | 4.7 | 7 | 1.7 | — | — | 9.6 | 44 | 0.31 | 30 | " | 0.836 |

TABLE 3

| Examples & Comparative Examples | Acicular goethite particles (Example No. & Comparative Example No.) | Coating with P compound | | Heating temperature in air (°C.) | Reducing temperature (°C.) |
|---|---|---|---|---|---|
| | | Kind | Amount (wt %) | | |
| Example 15 | Example 1 | Sodium hexametaphosphate | 1.15 | 320 | 360 |
| Example 16 | Example 2 | Sodium hexametaphosphate | 1.15 | 320 | 360 |
| Example 17 | Example 3 | Sodium hexametaphosphate | 1.15 | 320 | 360 |
| Example 18 | Example 4 | Sodium hexametaphosphate | 1.15 | 320 | 360 |
| Example 19 | Example 5 | Sodium hexametaphosphate | 1.15 | 320 | 360 |

TABLE 3-continued

| | | | | | |
|---|---|---|---|---|---|
| Example 20 | Example 6 | Sodium hexametaphosphate | 1.15 | 650 | 360 |
| Example 21 | Example 7 | Sodium hexametaphosphate | 1.15 | 320 | 360 |
| Example 22 | Example 8 | Sodium hexametaphosphate | 1.15 | 320 | 360 |
| Example 23 | Example 9 | Sodium hexametaphosphate | 1.15 | 660 | 360 |
| Example 24 | Example 10 | Sodium hexametaphosphate | 1.15 | 660 | 360 |
| Example 25 | Example 11 | Sodium hexametaphosphate | 1.15 | 660 | 360 |
| Example 26 | Example 12 | Sodium hexametaphosphate | 1.15 | 660 | 360 |
| Example 27 | Example 13 | Sodium hexametaphosphate | 1.15 | 660 | 360 |
| Example 28 | Example 14 | Sodium hexametaphosphate | 1.15 | 660 | 360 |
| Comparative Example 7 | Comparative Example 1 | Sodium hexametaphosphate | 1.15 | 320 | 360 |
| Comparative Example 8 | Comparative Example 2 | Sodium hexametaphosphate | 1.15 | 320 | 360 |
| Comparative Example 9 | Comparative Example 3 | Sodium hexametaphosphate | 1.15 | 320 | 360 |
| Comparative Example 10 | Comparative Example 4 | Sodium hexametaphosphate | 1.15 | 650 | 360 |
| Comparative Example 11 | Comparative Example 5 | Sodium hexametaphosphate | 1.15 | 320 | 360 |
| Comparative Example 12 | Comparative Example 6 | Sodium hexametaphosphate | 1.15 | 320 | 360 |

| | Acicular magnetite particles | | | | |
|---|---|---|---|---|---|
| Examples & Comparative Examples | Major axial diameter ($\mu$m) | Aspect ratio (major axial diameter/minor axial diameter) | Particle size distribution | Coercive force Hc (Oe) | Saturation magnetization $\sigma_s$ (emu/g) |
| Example 15 | 0.25 | 7.5 | 0.67 | 400 | 82.7 |
| Example 16 | 0.20 | 7.7 | 0.65 | 383 | 79.5 |
| Example 17 | 0.24 | 7.4 | 0.66 | 510 | 79.0 |
| Example 18 | 0.17 | 6.8 | 0.63 | 375 | 82.1 |
| Example 19 | 0.13 | 7.0 | 0.63 | 358 | 78.9 |
| Example 20 | 0.29 | 6.9 | 0.65 | 420 | 82.0 |
| Example 21 | 0.24 | 7.0 | 0.64 | 399 | 81.4 |
| Example 22 | 0.27 | 6.7 | 0.66 | 408 | 81.3 |
| Example 23 | 0.30 | 8.0 | 0.67 | 406 | 82.7 |
| Example 24 | 0.14 | 7.2 | 0.68 | 350 | 79.2 |
| Example 25 | 0.20 | 7.8 | 0.73 | 380 | 80.5 |
| Example 26 | 0.17 | 7.4 | 0.75 | 361 | 82.5 |
| Example 27 | 0.28 | 7.6 | 0.72 | 410 | 78.6 |
| Example 28 | 0.22 | 7.9 | 0.74 | 378 | 81.0 |
| Comparative Example 7 | 0.16 | 5.6 | 0.42 | 346 | 82.0 |
| Comparative Example 8 | 0.15 | 5.7 | 0.41 | 340 | 82.1 |
| Comparative Example 9 | 0.22 | 5.0 | 0.58 | 352 | 82.4 |
| Comparative Example 10 | 0.23 | 5.3 | 0.44 | 383 | 82.5 |
| Comparative Example 11 | 0.25 | 5.2 | 0.43 | 387 | 82.5 |
| Comparative Example 12 | 0.14 | 4.9 | 0.50 | 333 | 82.2 |

TABLE 4

| Examples & Comparative Examples | Acicular magnetite particles (Example No. & Comparative Example No.) | Acicular maghemite particles | | | | |
|---|---|---|---|---|---|---|
| | | Major axial diameter (μm) | Aspect ratio (major axial diameter/minor axial diameter) | Particle size distribution | Coercive force Hc (Oe) | Saturation magnetization $\sigma_s$ (emu/g) |
| Example 29 | Example 15 | 0.24 | 7.4 | 0.66 | 371 | 72.2 |
| Example 30 | Example 16 | 0.19 | 7.6 | 0.65 | 353 | 69.3 |
| Example 31 | Example 17 | 0.22 | 7.2 | 0.65 | 395 | 68.8 |
| Example 32 | Example 18 | 0.16 | 6.7 | 0.62 | 348 | 71.8 |
| Example 33 | Example 19 | 0.13 | 7.0 | 0.63 | 330 | 68.1 |
| Example 34 | Example 20 | 0.28 | 6.8 | 0.64 | 394 | 70.9 |
| Example 35 | Example 21 | 0.24 | 7.0 | 0.63 | 370 | 71.0 |
| Example 36 | Example 22 | 0.25 | 6.6 | 0.65 | 352 | 71.0 |
| Example 37 | Example 23 | 0.29 | 7.8 | 0.67 | 380 | 71.5 |
| Example 38 | Example 24 | 0.14 | 7.1 | 0.68 | 338 | 70.3 |
| Example 39 | Example 25 | 0.18 | 7.7 | 0.74 | 360 | 71.2 |
| Example 40 | Example 26 | 0.16 | 7.2 | 0.77 | 342 | 71.8 |
| Example 41 | Example 27 | 0.27 | 7.5 | 0.73 | 391 | 70.1 |
| Example 42 | Example 28 | 0.21 | 7.7 | 0.75 | 362 | 71.6 |
| Comparative Example 13 | Comparative Example 7 | 0.15 | 5.5 | 0.41 | 316 | 72.0 |
| Comparative Example 14 | Comparative Example 8 | 0.15 | 5.6 | 0.40 | 310 | 72.0 |
| Comparative Example 15 | Comparative Example 9 | 0.21 | 4.8 | 0.57 | 324 | 73.1 |
| Comparative Example 16 | Comparative Example 10 | 0.22 | 5.2 | 0.44 | 351 | 72.5 |
| Comparative Example 17 | Comparative Example 11 | 0.23 | 5.0 | 0.42 | 348 | 73.3 |
| Comparative Example 18 | Comparative Example 12 | 0.13 | 4.7 | 0.49 | 307 | 71.8 |

TABLE 5

| Examples & Comparative Examples | Precursor particles (Example No. & Comparative Example No.) | Production of acicular magnetite particles modified with Co or Co and $Fe^{2+}$ | | | |
|---|---|---|---|---|---|
| | | Amount of Co added (mol) | Amount of $Fe^{2+}$ added (mol) | Amount of sodium hydroxide added (ml) | Temperature (°C.) |
| Example 43 | Example 15 | 0.085 | 0.179 | 102 | 100 |
| Example 44 | Example 15 | 0.0509 | 0.179 | 98 | 100 |
| Example 45 | Example 15 | 0.0509 | 0.179 | 170 | 100 |
| Example 46 | Example 15 | 0.0509 | 0.1074 | 162 | 100 |
| Example 47 | Example 15 | 0.0509 | — | 150 | 100 |
| Example 48 | Example 16 | 0.085 | 0.179 | 102 | 100 |
| Example 49 | Example 17 | 0.085 | 0.179 | 102 | 100 |
| Example 50 | Example 18 | 0.085 | 0.179 | 102 | 100 |
| Example 51 | Example 19 | 0.085 | 0.179 | 102 | 100 |
| Example 52 | Example 20 | 0.085 | 0.179 | 102 | 100 |
| Example 53 | Example 21 | 0.085 | 0.179 | 102 | 100 |
| Example 54 | Example 22 | 0.085 | 0.179 | 102 | 100 |
| Example 55 | Example 23 | 0.085 | 0.179 | 102 | 100 |
| Example 56 | Example 24 | 0.085 | 0.179 | 102 | 100 |
| Example 57 | Example 25 | 0.085 | 0.179 | 102 | 100 |
| Example 58 | Example 26 | 0.085 | 0.179 | 102 | 100 |
| Example 59 | Example 27 | 0.085 | 0.179 | 102 | 100 |
| Example 60 | Example 28 | 0.085 | 0.179 | 102 | 100 |
| Comparative Example 19 | Comparative Example 7 | 0.085 | 0.179 | 102 | 100 |
| Comparative Example 20 | Comparative Example 8 | 0.085 | 0.179 | 102 | 100 |
| Comparative Example 21 | Comparative Example 9 | 0.085 | 0.179 | 102 | 100 |
| Comparative Example 22 | Comparative Example 10 | 0.085 | 0.179 | 102 | 100 |
| Comparative Example 23 | Comparative Example 11 | 0.085 | 0.179 | 102 | 100 |
| Comparative Example 24 | Comparative Example 12 | 0.085 | 0.179 | 102 | 100 |

| Examples & Comparative Examples | Acicular magnetite particles modified with Co or Co and $Fe^{2+}$ | | | | |
|---|---|---|---|---|---|
| | Major axial diameter (μm) | Aspect ratio (major axial diameter/minor axial diameter) | Particle size distribution | Coercive force Hc (Oe) | Saturation magnetization $\sigma_s$ (emu/g) |
| Example 43 | 0.23 | 6.7 | 0.62 | 825 | 84.6 |
| Example 44 | 0.23 | 6.8 | 0.63 | 730 | 85.2 |

TABLE 5-continued

| | | | | | |
|---|---|---|---|---|---|
| Example 45 | 0.23 | 6.8 | 0.63 | 762 | 85.4 |
| Example 46 | 0.22 | 6.9 | 0.64 | 725 | 84.5 |
| Example 47 | 0.22 | 7.1 | 0.65 | 680 | 80.7 |
| Example 48 | 0.18 | 6.7 | 0.61 | 835 | 81.6 |
| Example 49 | 0.23 | 6.6 | 0.63 | 945 | 82.0 |
| Example 50 | 0.15 | 5.8 | 0.59 | 840 | 84.0 |
| Example 51 | 0.12 | 5.8 | 0.60 | 850 | 81.3 |
| Example 52 | 0.26 | 6.2 | 0.61 | 805 | 84.2 |
| Example 53 | 0.22 | 6.2 | 0.60 | 810 | 83.7 |
| Example 54 | 0.25 | 6.1 | 0.60 | 805 | 83.5 |
| Example 55 | 0.29 | 7.2 | 0.66 | 851 | 85.3 |
| Example 56 | 0.14 | 6.2 | 0.65 | 750 | 81.5 |
| Example 57 | 0.18 | 7.0 | 0.72 | 785 | 83.2 |
| Example 58 | 0.16 | 6.4 | 0.74 | 790 | 84.0 |
| Example 59 | 0.27 | 6.9 | 0.73 | 848 | 84.4 |
| Example 60 | 0.20 | 7.1 | 0.72 | 812 | 82.5 |
| Comparative Example 19 | 0.14 | 4.8 | 0.39 | 810 | 84.1 |
| Comparative Example 20 | 0.12 | 5.0 | 0.38 | 820 | 83.9 |
| Comparative Example 21 | 0.20 | 4.3 | 0.54 | 790 | 84.6 |
| Comparative Example 22 | 0.20 | 4.6 | 0.42 | 805 | 84.5 |
| Comparative Example 23 | 0.23 | 4.5 | 0.40 | 795 | 84.7 |
| Comparative Example 24 | 0.13 | 4.0 | 0.47 | 820 | 84.0 |

TABLE 6

| | | Production of acicular maghemite particles modified with CO or CO and $Fe^{2+}$ | | | | Acicular maghemite particles with CO or CO and $Fe^{2+}$ | | | | |
|---|---|---|---|---|---|---|---|---|---|---|
| Examples & Comparative Examples | Precursor particles (Example No. & Comparative Example No.) | Amount of Co added (mol) | Amount of $Fe^{2+}$ added (mol) | Amount of sodium hydroxide added (ml) | Temperature (°C.) | Major axial diameter (μm) | Aspect ratio (major axial diameter/minor axial diameter) | Particle size distribution | Coercive force Hc (Oe) | Saturation magnetization $\sigma_s$ (emu/g) |
| Example 61 | Example 29 | 0.085 | 0.179 | 102 | 100 | 0.22 | 6.6 | 0.63 | 790 | 77.0 |
| Example 62 | Example 29 | 0.0509 | 0.179 | 98 | 100 | 0.22 | 6.7 | 0.63 | 705 | 77.5 |
| Example 63 | Example 29 | 0.0509 | 0.179 | 170 | 100 | 0.22 | 6.6 | 0.64 | 735 | 77.8 |
| Example 64 | Example 29 | 0.0509 | 0.1074 | 162 | 100 | 0.21 | 6.8 | 0.64 | 696 | 76.8 |
| Example 65 | Example 29 | 0.0509 | — | 150 | 100 | 0.21 | 7.0 | 0.65 | 653 | 70.0 |
| Example 66 | Example 30 | 0.085 | 0.179 | 102 | 100 | 0.18 | 6.6 | 0.62 | 808 | 74.5 |
| Example 67 | Example 31 | 0.085 | 0.179 | 102 | 100 | 0.20 | 6.4 | 0.62 | 839 | 74.0 |
| Example 68 | Example 32 | 0.085 | 0.179 | 102 | 100 | 0.15 | 5.6 | 0.58 | 806 | 76.4 |
| Example 69 | Example 33 | 0.085 | 0.179 | 102 | 100 | 0.11 | 5.7 | 0.60 | 825 | 73.0 |
| Example 70 | Example 34 | 0.085 | 0.179 | 102 | 100 | 0.26 | 6.1 | 0.60 | 780 | 75.3 |
| Example 71 | Example 35 | 0.085 | 0.179 | 102 | 100 | 0.22 | 6.0 | 0.60 | 786 | 76.0 |
| Example 72 | Example 36 | 0.085 | 0.179 | 102 | 100 | 0.23 | 6.9 | 0.62 | 775 | 76.3 |
| Example 73 | Example 37 | 0.085 | 0.179 | 102 | 100 | 0.27 | 7.0 | 0.67 | 820 | 78.5 |
| Example 74 | Example 38 | 0.095 | 0.179 | 102 | 100 | 0.13 | 6.0 | 0.66 | 731 | 74.7 |
| Example 75 | Example 39 | 0.085 | 0.179 | 102 | 100 | 0.16 | 6.5 | 0.73 | 756 | 77.2 |
| Example 76 | Example 40 | 0.085 | 0.179 | 102 | 100 | 0.15 | 6,4 | 0.77 | 763 | 75.1 |
| Example 77 | Example 41 | 0.085 | 0.179 | 102 | 100 | 0.26 | 6.9 | 0.74 | 821 | 79.0 |
| Example 78 | Example 42 | 0.085 | 0.179 | 102 | 100 | 0.19 | 6.8 | 0.74 | 785 | 76.2 |
| Comparative Example 25 | Comparative Example 13 | 0.085 | 0.179 | 102 | 100 | 0.14 | 4.6 | 0.38 | 782 | 76.8 |
| Comparative Example 26 | Comparative Example 14 | 0.085 | 0.179 | 102 | 100 | 0.13 | 4.8 | 0.37 | 785 | 77.3 |
| Comparative Example 27 | Comparative Example 15 | 0.085 | 0.179 | 102 | 100 | 0.19 | 4.1 | 0.54 | 760 | 78.3 |
| Comparative Example 28 | Comparative Example 16 | 0.085 | 0.179 | 102 | 100 | 0.20 | 4.5 | 0.41 | 779 | 77.2 |
| Comparative Example 29 | Comparative Example 17 | 0.085 | 0.179 | 102 | 100 | 0.21 | 4.4 | 0.38 | 768 | 78.0 |
| Comparative Example 30 | Comparative Example 18 | 0.085 | 0.179 | 102 | 100 | 0.12 | 3.9 | 0.46 | 795 | 76.5 |

TABLE 7

| | | Tape properties | | | | |
|---|---|---|---|---|---|---|
| Examples & Comparative Examples | Magnetic Particles (Example No. & Comparative Example No.) | S.F.D. | Squareness (Br/Bm) | Coercive force Hc (Oe) | Residual flux density Br (Gauss) | Orientation |
| Example 79 | Example 15 | 0.44 | 0.82 | 369 | 1630 | 2.13 |
| Example 80 | Example 16 | 0.47 | 0.80 | 355 | 1520 | 1.98 |
| Example 81 | Example 17 | 0.43 | 0.83 | 470 | 1500 | 2.32 |
| Example 82 | Example 18 | 0.50 | 0.79 | 349 | 1610 | 2.08 |

TABLE 7-continued

| Examples & Comparative Examples | Magnetic Particles (Example No. & Comparative Example No.) | Tape properties | | | | |
|---|---|---|---|---|---|---|
| | | S.F.D. | Squareness (Br/Bm) | Coercive force Hc (Oe) | Residual flux density Br (Gauss) | Orientation |
| Example 83 | Example 19 | 0.52 | 0.77 | 331 | 1480 | 1.78 |
| Example 84 | Example 20 | 0.42 | 0.84 | 393 | 1600 | 2.45 |
| Example 85 | Example 21 | 0.44 | 0.82 | 370 | 1560 | 2.23 |
| Example 86 | Example 22 | 0.41 | 0.78 | 378 | 1550 | 1.98 |
| Example 87 | Example 23 | 0.45 | 0.85 | 380 | 1640 | 2.81 |
| Example 88 | Example 24 | 0.52 | 0.79 | 339 | 1580 | 2.36 |
| Example 89 | Example 25 | 0.41 | 0.80 | 361 | 1590 | 2.15 |
| Example 90 | Example 26 | 0.42 | 0.79 | 345 | 1620 | 2.01 |
| Example 91 | Example 27 | 0.41 | 0.83 | 391 | 1640 | 2.42 |
| Example 92 | Example 28 | 0.40 | 0.82 | 367 | 1680 | 2.68 |
| Comparative Example 31 | Comparative Example 7 | 0.62 | 0.69 | 318 | 1350 | 1.82 |
| Comparative Example 32 | Comparative Example 8 | 0.65 | 0.69 | 312 | 1330 | 1.78 |
| Comparative Example 33 | Comparative Example 9 | 0.56 | 0.70 | 325 | 1350 | 1.81 |
| Comparative Example 34 | Comparative Example 10 | 0.59 | 0.70 | 351 | 1360 | 1.85 |
| Comparative Example 35 | Comparative Example 11 | 0.60 | 0.72 | 358 | 1400 | 1.92 |
| Comparative Example 36 | Comparative Example 12 | 0.67 | 0.68 | 306 | 1310 | 1.61 |

TABLE 8

| Examples & Comparative Examples | Magnetic Particles (Example No. & Comparative Example No.) | Tape properties | | | | |
|---|---|---|---|---|---|---|
| | | S.F.D. | Squareness (Br/Bm) | Coercive force Hc (Oe) | Residual flux density Br (Gauss) | Orientation |
| Example 93 | Example 29 | 0.35 | 0.84 | 345 | 1350 | 2.40 |
| Example 94 | Example 30 | 0.38 | 0.82 | 336 | 1280 | 2.28 |
| Example 95 | Example 31 | 0.33 | 0.86 | 370 | 1220 | 2.55 |
| Example 96 | Example 32 | 0.41 | 0.81 | 314 | 1310 | 2.31 |
| Example 97 | Example 33 | 0.42 | 0.79 | 305 | 1230 | 2.05 |
| Example 98 | Example 34 | 0.32 | 0.86 | 361 | 1290 | 2.72 |
| Example 99 | Example 35 | 0.33 | 0.84 | 358 | 1290 | 2.58 |
| Example 100 | Example 36 | 0.31 | 0.80 | 320 | 1300 | 2.21 |
| Example 101 | Example 37 | 0.33 | 0.87 | 358 | 1390 | 3.07 |
| Example 102 | Example 38 | 0.42 | 0.81 | 317 | 1250 | 2.55 |
| Example 103 | Example 39 | 0.31 | 0.83 | 335 | 1280 | 2.47 |
| Example 104 | Example 40 | 0.32 | 0.82 | 321 | 1300 | 2.31 |
| Example 105 | Example 41 | 0.30 | 0.86 | 367 | 1330 | 2.77 |
| Example 106 | Example 42 | 0.30 | 0.84 | 338 | 1350 | 2.89 |
| Comparative Example 37 | Comparative Example 13 | 0.53 | 0.71 | 288 | 1150 | 2.01 |
| Comparative Example 38 | Comparative Example 14 | 0.55 | 0.71 | 283 | 1140 | 1.98 |
| Comparative Example 39 | Comparative Example 15 | 0.48 | 0.72 | 297 | 1190 | 2.20 |
| Comparative Example 40 | Comparative Example 16 | 0.49 | 0.72 | 321 | 1200 | 2.15 |
| Comparative Example 41 | Comparative Example 17 | 0.49 | 0.74 | 330 | 1210 | 2.32 |
| Comparative Example 42 | Comparative Example 18 | 0.58 | 0.70 | 275 | 1130 | 1.95 |

TABLE 9

| Examples & Comparative Examples | Magnetic Particles (Example No. & Comparative Example No.) | Tape properties | | | | |
|---|---|---|---|---|---|---|
| | | S.F.D. | Squareness (Br/Bm) | Coercive force Hc (Oe) | Residual flux density Br (Gauss) | Orientation |
| Example 107 | Example 43 | 0.47 | 0.82 | 855 | 1630 | 2.00 |
| Example 108 | Example 44 | 0.44 | 0.82 | 762 | 1640 | 2.06 |
| Example 109 | Example 45 | 0.42 | 0.83 | 790 | 1670 | 2.10 |
| Example 110 | Example 46 | 0.39 | 0.84 | 750 | 1670 | 2.14 |
| Example 111 | Example 47 | 0.38 | 0.85 | 701 | 1620 | 2.15 |
| Example 112 | Example 48 | 0.50 | 0.80 | 856 | 1530 | 1.81 |
| Example 113 | Example 49 | 0.45 | 0.82 | 995 | 1580 | 2.28 |
| Example 114 | Example 50 | 0.52 | 0.80 | 862 | 1580 | 2.00 |
| Example 115 | Example 51 | 0.55 | 0.76 | 865 | 1450 | 1.72 |
| Example 116 | Example 52 | 0.45 | 0.85 | 835 | 1680 | 2.38 |
| Example 117 | Example 53 | 0.46 | 0.82 | 826 | 1610 | 2.15 |
| Example 118 | Example 54 | 0.44 | 0.79 | 823 | 1650 | 1.89 |
| Example 119 | Example 55 | 0.47 | 0.85 | 879 | 1680 | 2.78 |
| Example 120 | Example 56 | 0.53 | 0.80 | 782 | 1600 | 2.30 |
| Example 121 | Example 57 | 0.41 | 0.81 | 809 | 1620 | 2.07 |
| Example 122 | Example 58 | 0.42 | 0.79 | 821 | 1680 | 1.96 |
| Example 123 | Example 59 | 0.41 | 0.83 | 871 | 1690 | 2.25 |
| Example 124 | Example 60 | 0.41 | 0.82 | 840 | 1720 | 2.59 |
| Comparative Example 43 | Comparative Example 19 | 0.65 | 0.69 | 825 | 1360 | 1.75 |
| Comparative Example 44 | Comparative Example 20 | 0.67 | 0.70 | 837 | 1380 | 1.69 |
| Comparative Example 45 | Comparative Example 21 | 0.62 | 0.71 | 804 | 1410 | 1.70 |
| Comparative Example 46 | Comparative Example 22 | 0.62 | 0.70 | 820 | 1390 | 1.72 |
| Comparative Example 47 | Comparative Example 23 | 0.49 | 0.73 | 812 | 1450 | 1.85 |

TABLE 9-continued

| Examples & Comparative Examples | Magnetic Particles (Example No. & Comparative Example No.) | S.F.D. | Squareness (Br/Bm) | Coercive force He (Oe) | Residual flux density Br (Gauss) | Orientation |
| --- | --- | --- | --- | --- | --- | --- |
| Comparative Example 48 | Comparative Example 24 | 0.70 | 0.67 | 833 | 1320 | 1.58 |

TABLE 10

| Examples & Comparative Examples | Magnetic Particles (Example No. & Comparative Example No.) | S.F.D. | Squareness (Br/Bm) | Coercive force He (Oe) | Residual flux density Br (Gauss) | Orientation |
| --- | --- | --- | --- | --- | --- | --- |
| Example 125 | Example 61 | 0.39 | 0.83 | 816 | 1500 | 2.25 |
| Example 126 | Example 62 | 0.36 | 0.84 | 732 | 1530 | 2.27 |
| Example 127 | Example 63 | 0.35 | 0.85 | 766 | 1550 | 2.29 |
| Example 128 | Example 64 | 0.32 | 0.86 | 726 | 1550 | 2.33 |
| Example 129 | Example 65 | 0.30 | 0.87 | 684 | 1430 | 2.35 |
| Example 130 | Example 66 | 0.41 | 0.83 | 829 | 1450 | 2.10 |
| Example 131 | Example 67 | 0.37 | 0.86 | 880 | 1500 | 2.45 |
| Example 132 | Example 68 | 0.43 | 0.81 | 826 | 1450 | 2.20 |
| Example 133 | Example 69 | 0.45 | 0.80 | 843 | 1370 | 2.00 |
| Example 134 | Example 70 | 0.36 | 0.85 | 807 | 1500 | 2.61 |
| Example 135 | Example 71 | 0.36 | 0.85 | 810 | 1520 | 2.42 |
| Example 136 | Example 72 | 0.34 | 0.81 | 794 | 1440 | 2.11 |
| Example 137 | Example 73 | 0.34 | 0.87 | 841 | 1620 | 3.00 |
| Example 138 | Example 74 | 0.41 | 0.82 | 750 | 1400 | 2.46 |
| Example 139 | Example 76 | 0.31 | 0.83 | 768 | 1410 | 2.38 |
| Example 140 | Example 76 | 0.31 | 0.82 | 785 | 1420 | 2.25 |
| Example 141 | Example 77 | 0.30 | 0.86 | 845 | 1520 | 2.70 |
| Example 142 | Example 78 | 0.30 | 0.84 | 800 | 1550 | 2.82 |
| Comparative Example 49 | Comparative Example 25 | 0.57 | 0.70 | 798 | 1270 | 1.98 |
| Comparative Example 50 | Comparative Example 26 | 0.58 | 0.71 | 801 | 1295 | 1.90 |
| Comparative Example 51 | Comparative Example 27 | 0.53 | 0.73 | 778 | 1350 | 2.05 |
| Comparative Example 52 | Comparative Example 28 | 0.52 | 0.71 | 793 | 1290 | 2.10 |
| Comparative Example 53 | Comparative Example 29 | 0.51 | 0.74 | 788 | 1360 | 2.16 |
| Comparative Example 54 | Comparative Example 30 | 0.60 | 0.69 | 809 | 1240 | 1.89 |

What is claimed is:

1. A process for producing acicular goethite particles having an aspect ratio of not less than 20 comprising the steps of
   (a) blowing an oxygen-containing gas into a ferrous salt reaction solution containing either colloidal ferrous hydroxide which is obtained by reacting an aqueous ferrous salt solution with less than one equivalent of an aqueous alkali hydroxide solution based on $Fe^{2+}$ in said aqueous ferrous salt solution or iron-containing colloidalprecipitates which are obtained by reacting an aqueous ferrous salt solution with less than one equivalent of an aqueous alkali carbonate solution or aqueous alkali hydroxide and alkali carbonate solution based on $Fe2+$ in said aqueous ferrous salt solution so as to oxidize said colloidal ferrous hydroxide or iron-containing colloidal precipitates and to produce acicular goethite nucleus particles;
   (b) adding to the resultant aqueous ferrous salt reaction solution containing from 10 to 90 mol % of said acicular goethite nucleus particles based upon the total amount of goethite particles produced in the process, not less than one equivalent of an aqueous alkali carbonate solution based on $Fe^{2+}$ in said aqueous ferrous salt reaction solution; and
   (c) blowing an oxygen containing gas into the mixed aqueous ferrous salt reaction solution so as to grow said nucleus goethite particles
wherein the reaction temperature for producing goethite nucleus particles, the oxidization temperature and the reaction temperature for growing goethite nucleus particles are not higher than 80° C.

2. A process according to claim 1, including the additional step of:
   (d) heat-treating the resultant aqueous ferrous salt reaction solution containing the acicular goethite nucleus particles at a temperature of not less than 75° C. before the addition of the aqueous alkali carbonate solution, and cooling the resultant aqueous ferrous solution containing said acicular goethite nucleus particles at a temperature of less than 60° C.

3. A process according to claim 1, which further comprises maintaining the resultant aqueous ferrous salt reaction solution containing the acicular goethite nucleus particles at a temperature of less than 60° C. in a non-oxidizing atmosphere before the addition of the aqueous alkali carbonate solution.

4. A process according to claim 1, which further comprises heat-treating the resultant aqueous ferrous salt reaction solution containing the acicular goethite nucleus particles at a temperature of not less than 75° C. before the addition of the aqueous alkali carbonate solution, cooling the resultant aqueous ferrous salt reaction solution containing the acicular goethite nucleus particles to the temperature of less than 60° C. and maintaining the resultant aqueous ferrous salt reaction solution containing the acicular goethite nucleus particles in non-oxidizing atmosphere.

5. A process for producing acicular magnetic iron oxide particles comprising the steps of: heat-treating in a reducing gas said acicular goethite particles obtained by a process as defined in claim 1 or acicular hematite particles obtained by heat-treating said acicular goethite particles at 300° to 700° C., thereby producing acicular magnetite particle.

6. A process according to claim 5, wherein the heat treatment in a reducing gas is carried out at 280° to 450° C.

7. A process according to claim 5 including the additional step of oxidizing the acicular magnetite particles, thereby producing acicular maghemite particles.

8. A process for producing acicular magnetic iron oxide particles comprising the steps of: dispersing acicular magnetite particles obtained by a process as defined in claim 5 or acicular maghemite particles obtained by a process defined in claim 7 in an alkaline suspension containing cobalt hydroxide or cobalt hydroxide and ferrous hydroxide so that the Co content in said suspension is 0.1 to 15.0 atomic % based on Fe of said magnetite or maghemite particles; and heat-treating the-resultant aqueous dispersion at a temperature of 50° to 100° C. thereby obtaining acicular magnetite particles or maghemite particles modified with Co or Co and $Fe^{2+}$.

9. A process according to claim 1, wherein the aspect ratio of the acicular goethite particles is from 22 to 35.